(12) United States Patent
Barsness et al.

(10) Patent No.: US 10,311,052 B2
(45) Date of Patent: Jun. 4, 2019

(54) QUERY GOVERNOR ENHANCEMENTS FOR DATABASES INTEGRATED WITH DISTRIBUTED PROGRAMMING ENVIRONMENTS

(71) Applicant: International Business Machines Corporation, Armonk, NY (US)

(72) Inventors: Eric L. Barsness, Pine Island, MN (US); Daniel E. Beuch, Rochester, MN (US); Alexander Cook, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 15/600,461

(22) Filed: May 19, 2017

(65) Prior Publication Data

US 2018/0336244 A1    Nov. 22, 2018

(51) Int. Cl.
| | | |
|---|---|---|
| *G06F 16/00* | (2019.01) | |
| *G06F 16/2452* | (2019.01) | |
| *G06F 17/30* | (2006.01) | |
| *G06F 16/2453* | (2019.01) | |
| *G06F 9/50* | (2006.01) | |

(52) U.S. Cl.
CPC .... *G06F 16/24524* (2019.01); *G06F 16/2453* (2019.01); *G06F 16/24544* (2019.01); *G06F 16/24545* (2019.01); *G06F 16/24549* (2019.01); *G06F 17/30433* (2013.01); *G06F 17/30442* (2013.01); *G06F 17/30466* (2013.01); *G06F 17/30469* (2013.01); *G06F 17/30474* (2013.01); *G06F 9/50* (2013.01)

(58) Field of Classification Search
CPC ................................................ G06F 16/24524
See application file for complete search history.

(56) References Cited

U.S. PATENT DOCUMENTS

| | | | |
|---|---|---|---|
| 7,739,265 B2 | 6/2010 | Jain et al. | |
| 8,620,945 B2 | 12/2013 | Chen et al. | |
| 9,158,837 B2 | 10/2015 | Gedik et al. | |

(Continued)

FOREIGN PATENT DOCUMENTS

EP     2936341 B1     9/2016

OTHER PUBLICATIONS

Nelson, D., "Announcing Stride—A Realtime Analytics API (/blog/announcing-stride-a-realtime-analytics-api)", retrieved Sep. 29, 2016, 5 pages <https://www.pipelinedb.com/blog/announcing-stride-a-realtime-analytics-api>.

(Continued)

*Primary Examiner* — Etienne P Leroux
(74) *Attorney, Agent, or Firm* — Patterson + Sheridan, LLP (57) ABSTRACT

Systems, methods, and computer program products to perform an operation comprising receiving, by a database management system (DBMS), a query for execution, computing, by a query governor, a first resource consumption value for executing a first portion of the received query against a plurality of data tuples in an operator graph of a distributed application, and upon determining that the first resource consumption value does not exceed a first threshold value, executing the query by operation of one or more computer processors.

20 Claims, 8 Drawing Sheets

(56) References Cited

U.S. PATENT DOCUMENTS

2007/0136254 A1 6/2007 Choi et al.
2010/0106946 A1* 4/2010 Imaki ............... G06F 17/30516
　　　　　　　　　　　　　　　　　　　　　712/220

OTHER PUBLICATIONS

Sotiropoulos, Y., et al., "LinkViews" An Integration Framework for Relational and Stream Systems, Enabling Real-Time Business Intelligence, Springer Berlin Heidelberg, 2015. 65-80.
Mozafari, B., et al., "Optimal Load Shedding with Aggregates and Mining Queries", 2010 IEEE 26th International Conference on Data Engineering (ICDE 2010). IEEE, 2010, 13 pages.

* cited by examiner

| QUERY 501 | CRITERION TYPE 502 | CRITERION THRESHOLD VALUE 503 | CRITERION TARGET 504 | ESTIMATED CRITERION VALUE 505 | EXCEEDS THRESHOLD? 506 | PERMIT QUERY EXECUTION? 507 |
|---|---|---|---|---|---|---|
| QUERY A | TIME | 100 MS | APPLICATION | 50 MS | N | Y |
| QUERY A | CPU CYCLES | 1,000,000 CYCLES | PROCESSING ELEMENTS X, Y | 900,000 | N | Y |
| QUERY B | MEMORY | 100 MB | OPERATOR A | 150 MB | Y | N |
| QUERY C | TIME | 100MS | OPERATORS D-F | 100 MS | N | Y |
| QUERY D | CPU CYCLES | 500,000 | PROCESSING ELEMENT Z | 1,000,000 | Y | N |
| QUERY E | STORAGE I/O LATENCY | 400 MS | APPLICATION | 500 MS | Y | N |
| QUERY E | TIME | 100 MS | APPLICATION | 30 MS | Y | N (BASED ON STORAGE I/O LATENCY) |

QUERY GOVERNOR ENHANCEMENTS FOR DATABASES INTEGRATED WITH DISTRIBUTED PROGRAMMING ENVIRONMENTS

BACKGROUND

The present invention relates to computer databases, and more specifically, to query governors which manage query execution for databases that are integrated with distributed programming environments.

Databases are computerized information storage and retrieval systems. A relational database management system is a computer database management system (DBMS) that uses relational techniques for storing and retrieving data. Streams programming is an example of a distributed programming model. Streams applications built using the streams programming model consist of streams of data flowing through processing elements that form an operator graph. Data coming into the streams application is said to come in via a source operator in the operator graph, where the source operator processes the data and sends the processed data to the next operator, and so on. Ultimately, some or all of the data processed by the streams application may be stored in a database. As such, many databases have been enhanced to integrate with streams applications. As a result of the integration, a query received by the database may include results from the data streams being processed by the streams application.

SUMMARY

In one embodiment, a method comprises receiving, by a database management system (DBMS), a query for execution, computing, by a query governor, a first resource consumption value for executing a first portion of the received query against a plurality of data tuples in an operator graph of a distributed application, and upon determining that the first resource consumption value does not exceed a first threshold value, executing the query by operation of one or more computer processors.

In another embodiment, a system comprises a processor and a memory storing instructions, which when executed by the processor, performs an operation comprising receiving, by a database management system (DBMS), a query for execution, computing, by a query governor, a first resource consumption value for executing a first portion of the received query against a plurality of data tuples in an operator graph of a distributed application, and upon determining that the first resource consumption value does not exceed a first threshold value, executing the query by operation of the processor.

In another embodiment, a computer-readable storage medium has computer-readable program code embodied therewith, the computer-readable program code executable by a processor to perform an operation comprising receiving, by a database management system (DBMS), a query for execution, computing, by a query governor, a first resource consumption value for executing a first portion of the received query against a plurality of data tuples in an operator graph of a distributed application, and upon determining that the first resource consumption value does not exceed a first threshold value, executing the query by operation of the processor.

DETAILED DESCRIPTION

Embodiments disclosed herein provide an enhanced query governor of a DBMS which limits the amount of time and/or computing resources used to access data in a distributed computing application, such as a streams computing application. For example, a user may specify a time threshold which sets an upper limit on the amount of time that may be spent to gather data from the streams computing application. When the user subsequently issues a query to the DBMS, the query governor may compute an initial estimated amount of time needed to process the query against the data of the streams computing application. In at least one embodiment, the query governor computes the initial estimated amount of time based on historical data reflecting the amounts of time needed to process similar queries. If the initial estimated amount of time exceeds the time threshold, the query governor may reject the query to improve performance of the DBMS and/or the streams computing application.

However, if the initial estimated amount of time does not exceed the time threshold, the query governor submits the query for execution. Furthermore, if the query is submitted for execution, the query governor may monitor the execution of the query. For example, during execution of the query, the query governor may compute an estimated remaining amount of time needed to process the query. If the estimated remaining amount of time exceeds the time threshold (or a second time threshold), the query governor may reject the query, halting execution of the query to conserve resources of the DBMS and/or the streams computing application. Similarly, if the estimated remaining amount of time exceeds the time threshold, the query governor may permit the execution of the query to complete.

Generally, the query governor may implement any number of different criteria for processing queries (or a portion of the queries) against the data of the streams computing application. For example, in addition to the time threshold, the user may specify a limit for the number of processor (CPU) cycles and a limit for the amount of memory used to process queries against the data of the streams computing application. In such an example, the query governor may compute estimated amounts of time, CPU cycles, and memory used to process the query. If any of the computed estimated amounts exceed the respective threshold, the query governor will reject the query.

Furthermore, the thresholds for time and/or computing resources may be specific to a type of query (e.g., a first time threshold for a select query, and a second time threshold for an update query). Additionally, the thresholds for time and/or computing resources may be applied to one or more of the streams computing application as a whole, one or more operators of the streams computing application, one or more processing elements of the streams computing application, and the like.

Figure 1A:
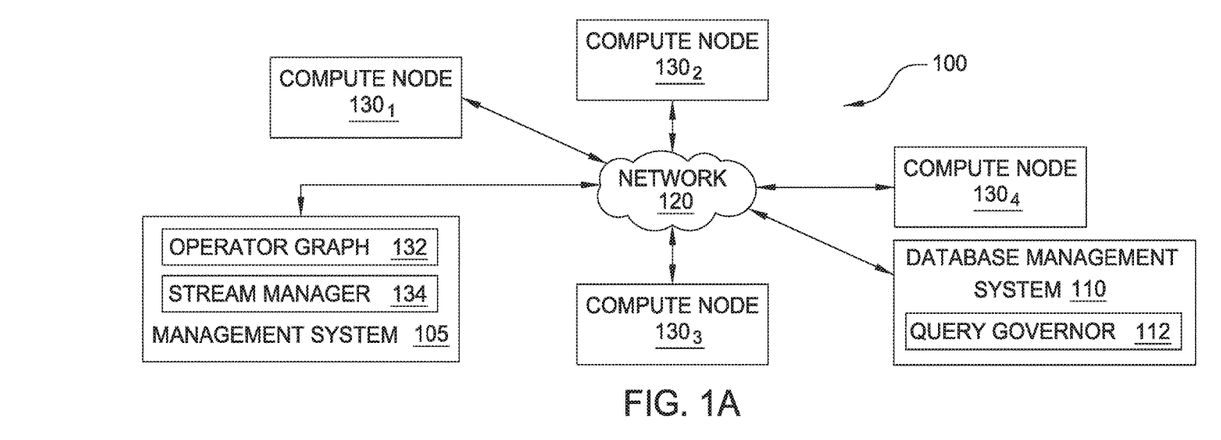
FIGS. 1A-1B illustrate a computing infrastructure that provides an enhanced query governor which manages query execution for databases that are integrated with streams computing applications, according to various embodiments.

FIG. 1A illustrates a computing infrastructure 100 that provides an enhanced query governor which manages query execution for databases that are integrated with streams computing applications, according to one embodiment. As shown, the computing infrastructure 100 includes a management system 105, a database management system 110, and a plurality of compute nodes $130_{1-4}$, each connected to a communications network 120. As shown, the management system 105 includes an operator graph 132 and a stream manager 134. As described in greater detail below, the operator graph 132 represents a streams computing application beginning from one or more operators in one or more source processing elements (PEs) through to one or more operators in one or more sink PEs. This flow from source to sink is also generally referred to herein as an execution path.

As shown, the DBMS 110 includes a query governor 112. Generally, query governors control the execution of queries received by the DBMS 110. The term "query" denominates a set of commands for retrieving data from a stored database (not pictured) and/or the operator graph 132 of the streams computing application. Queries take the form of a command language, such as the Structured Query Language (SQL), that lets programmers and programs select, insert, update, find out the location of data, and so forth. Generally speaking, any requesting entity can issue queries against data in a database and/or the streams computing application. For example, software applications, operating systems, and, at the highest level, users may submit queries to the DBMS 110. These queries may be predefined (i.e., hard coded as part of an application) or may be generated in response to input (e.g., user input). Upon receiving a query, the DBMS 110 may execute the request against the database and/or the streams computing application specified in the query, and then return the result of the executed query.

However, it may be desirable for the query governor 112 to only process certain requests it receives. That is, if a particular request would consume an excessive amount of resources (e.g., time and/or computing resources) to process, the query governor 112 may reject this query. Generally, upon receiving a query, the query governor may compute an estimated resource value for the query for one or more resources, such as time, CPU cycles, memory (RAM) use, network bandwidth, storage input/output (I/O), and the like. The estimated resource value may reflect the estimated resources for executing a portion of the query against the database, and the estimated resources for executing another portion of the query against the tuples of the streams computing application. If the query governor 112 determines that one or more of the estimated resource values exceeds a respective resource threshold, the query governor 112 may refuse the query for processing. For example, assume that the threshold amount of RAM is 1 gigabyte (GB) to process the query against the data of the streams computing application. If the query governor 112 receives a query and estimates it will take 2 GBs of RAM to process the received query against the data of the streams computing application, the query governor 112 may refuse the query for processing, and may notify the requesting entity accordingly. Furthermore, if the query governor 112 estimates that executing a portion of the query against the data of the streams computing application would use 1.5 GB of RAM, while executing a portion of the query against the database would use 0.5 GB of RAM, the query governor 112 may restrict execution of the portion of the query against the data of the streams computing application, while permitting execution of the query (or a portion of the query) against the database.

Furthermore, if the query governor 112 determines that the RAM consumption value does not exceed the 1 GB RAM threshold, the query governor 112 may submit the query to the DBMS 110 for processing. Once processing of the query has begun, the query governor 112 may periodically compute an updated estimated RAM consumption value for the query. If, while the query is executing, the query governor 112 determines that the updated estimated RAM consumption exceeds the 1 GB threshold, the query governor 112 may halt the execution of the query.

In one embodiment, the query governor 112 may use historical data in computing the estimated resource consumption values for a received query. Thus, for example, the historical data may contain data indicating that the DBMS 110 has previously processed a query against the data of the streams computing application, where the previously processed query is similar (or identical) to the received query. In such a case, the query governor 112 may compute the estimated resource consumption value (e.g., an estimated amount of time) for processing the received query against the data of the streams computing application based on a recorded time value for the previously processed query stored in the historical data. Of course, the above examples are merely for illustrative purposes, and one of ordinary skill in the art will recognize that other data, metadata and historical data, as well as combinations thereof, may be used as well when computing estimated resource consumption values.

Generally, in a streams computing application, data attributes flow into an operator of a source PE of a stream computing application and are processed by that operator. Typically, operators receive an N-tuple of data attributes from the stream as well as emit an N-tuple of data attributes into the stream (except for operators in a sink PE where the stream terminates). In general, a "tuple" is a single instance of a set of data attributes that follow the formatting of a schema, where the schema establishes a set of typed data attributes that may be used. For example, the tuple may be a chunk or portion of divisible data such as a data type (e.g., string, integer, Boolean, etc.) or combination of data types. In one embodiment, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values.

Of course, the N-tuple received by an operator need not be the same N-tuple sent downstream. Additionally, operators could be configured to receive or emit tuples in other formats (e.g., the PEs or operators could exchange data marked up as XML documents). Furthermore, each operator within a PE may be configured to carry out any form of data processing functions on the received tuple, including, for example, writing to database tables in the DBMS 110 or performing other database operations such as data joins, splits, reads, etc., as well as performing other data analytic functions or operations.

The stream manager 134 may be configured to monitor a stream computing application running on the compute nodes $130_{1-4}$, as well as to change the deployment of the operator graph 132. The stream manager 134 may move processing elements (PEs) from one compute node 130 to another, for example, to manage the processing loads of the compute nodes 130 in the computing infrastructure 100. Further, the stream manager 134 may receive a query from the DBMS 110 (or parameters from a query received by the DBMS 110), and return data tuples from the stream computing application that match the criteria of the query. Further, stream manager 134 may control the stream computing application by inserting, removing, fusing, un-fusing, or otherwise modifying the processing elements and operators (or what data tuples flow to the processing elements and operators) running on the compute nodes $130_{1-4}$. One example of a stream computing application is IBM®'s InfoSphere® Streams (InfoSphere® is a trademark of International Business Machines Corporation, registered in many jurisdictions worldwide).

Figure 1B:
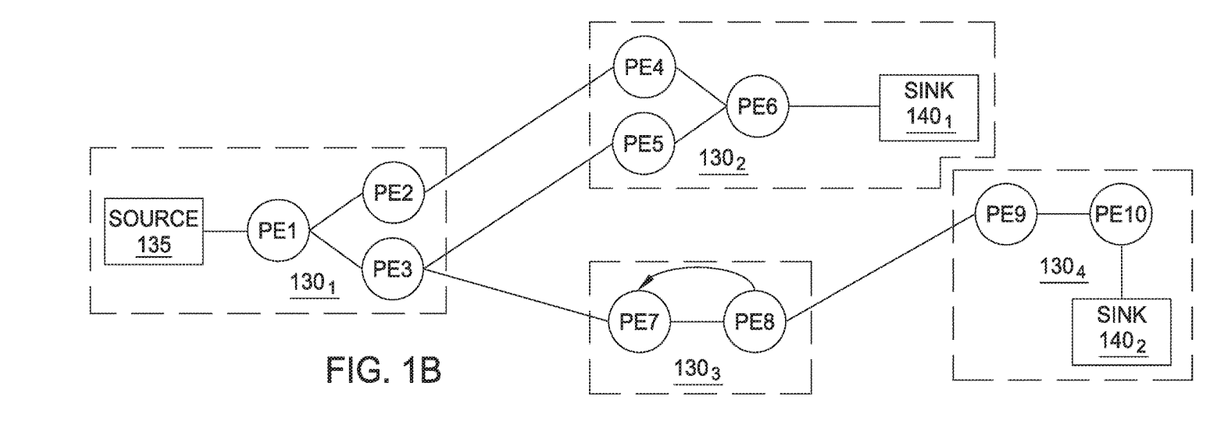

FIG. 1B illustrates an example processing element graph that includes ten processing elements (labeled as PE1-PE10) running on the compute nodes $130_{1-4}$. A processing element is composed of one or more operators fused (or combined) together into an independently running process with its own process ID (PID) and memory space. Inter-process communication between two or more processing elements may occur using a "transport" (e.g., a network socket, a TCP/IP socket, or shared memory). However, when operators are fused together, the fused operators can use other more rapid communication techniques for passing tuples among operators in each processing element.

As shown, the processing element graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into operators in the processing element PE1, which in turn emits tuples that are received by PE2 and PE3. For example, operators in PE1 may split data attributes received in a tuple and pass some data attributes to PE2, while passing other data attributes to PE3. Data that flows to PE2 is processed by the operators contained in PE2, and the resulting tuples are then emitted to the operators in PE4 on compute node $130_2$. Likewise, the data tuples emitted by the operators in PE4 flow to the operators sink PE6 $140_1$. Similarly, data tuples flowing from operators in PE3 to operators in PE5 also reach operators in sink PE6 $140_1$. Thus, in addition to being a sink for this example processing element graph, operators in PE6 could be configured to perform a join operation, combining tuples received from operators in PE4 and PE5. This example processing element graph also shows data tuples flowing from PE3 to PE7 on compute node $130_3$, which itself shows data tuples flowing to operators in PE8 and looping back to operators in PE7. Data tuples emitted from operators in PE8 flow to operators in PE9 on compute node $130_4$, which in turn emits tuples to be processed by operators in sink PE10 $140_2$.

Because a processing element is a collection of fused operators, it is equally correct to describe the operator graph as data flow paths between specific operators, which may include data flow paths to different operators within the same processing element.

Figure 2:
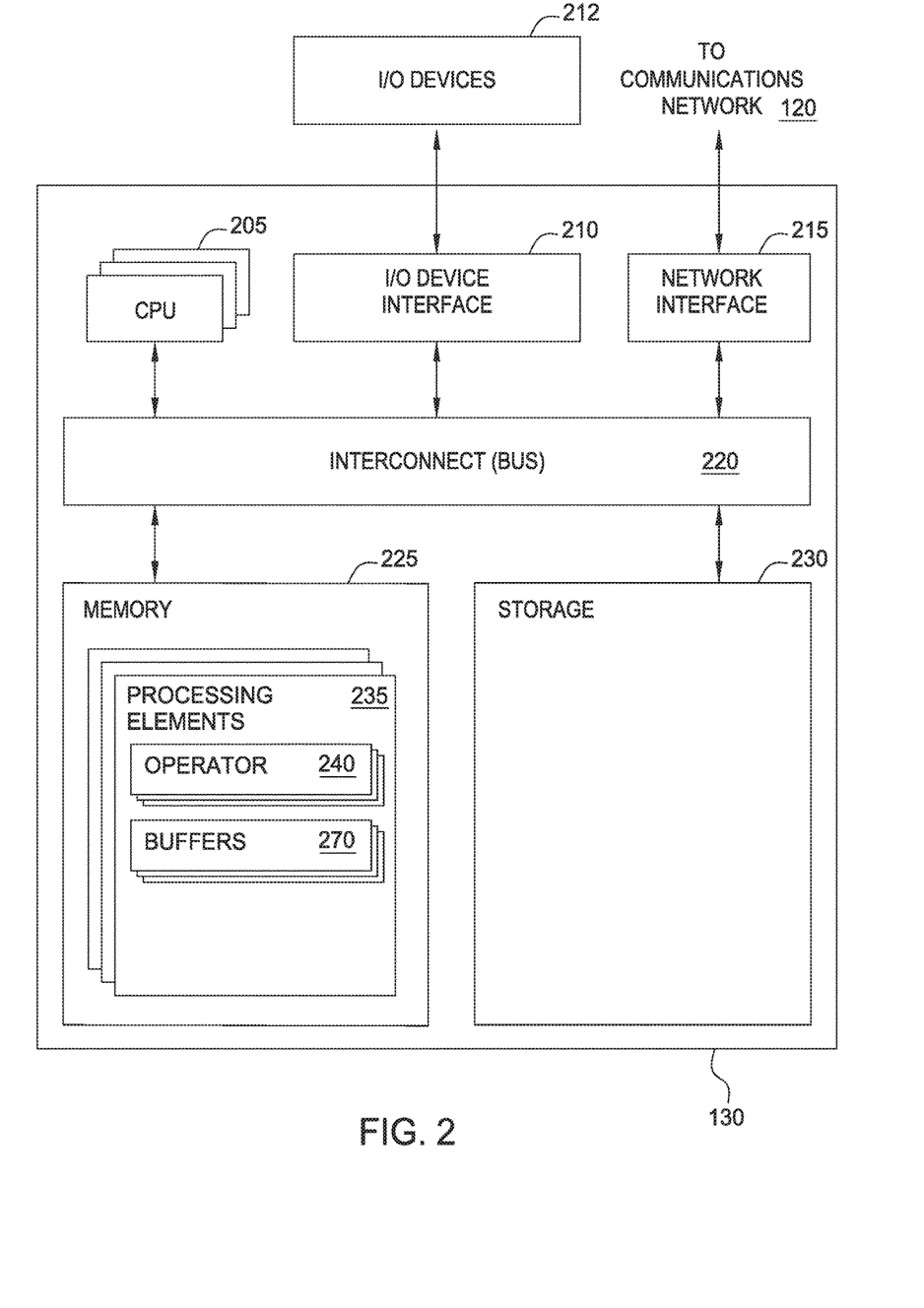
FIG. 2 is a more detailed view of the compute nodes of the streams computing application of FIGS. 1A-1B, according to one embodiment.

FIG. 2 is a more detailed view of the compute node 130 of the streams computing application of FIGS. 1A-1B, according to one embodiment. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of code configured to process data flowing into a processing element (e.g., PE 235) and to emit data to other operators 240 in the same PE or to other PEs in the stream computing application. Such processing elements may be on the same compute node 130 or on other compute nodes that are accessible via communications network 120.

As shown, the memory 225 further includes one or more buffers 270. The buffers 270 are generally configured to store data tuples that are being stored for subsequent processing by one or more operators 240 and/or PEs 235. Therefore, data tuples stored in the buffers 270 may be returned as responsive to a query being processed by the DBMS 110. Similarly, data tuples within the storage 230, operators 240, and/or PEs 235 may be returned by as responsive to a query being processed by the DBMS 110. Further still, data tuples that are in transit in the operator graph 132 may be returned by as responsive to a query being processed by the DBMS 110.

Figure 3:
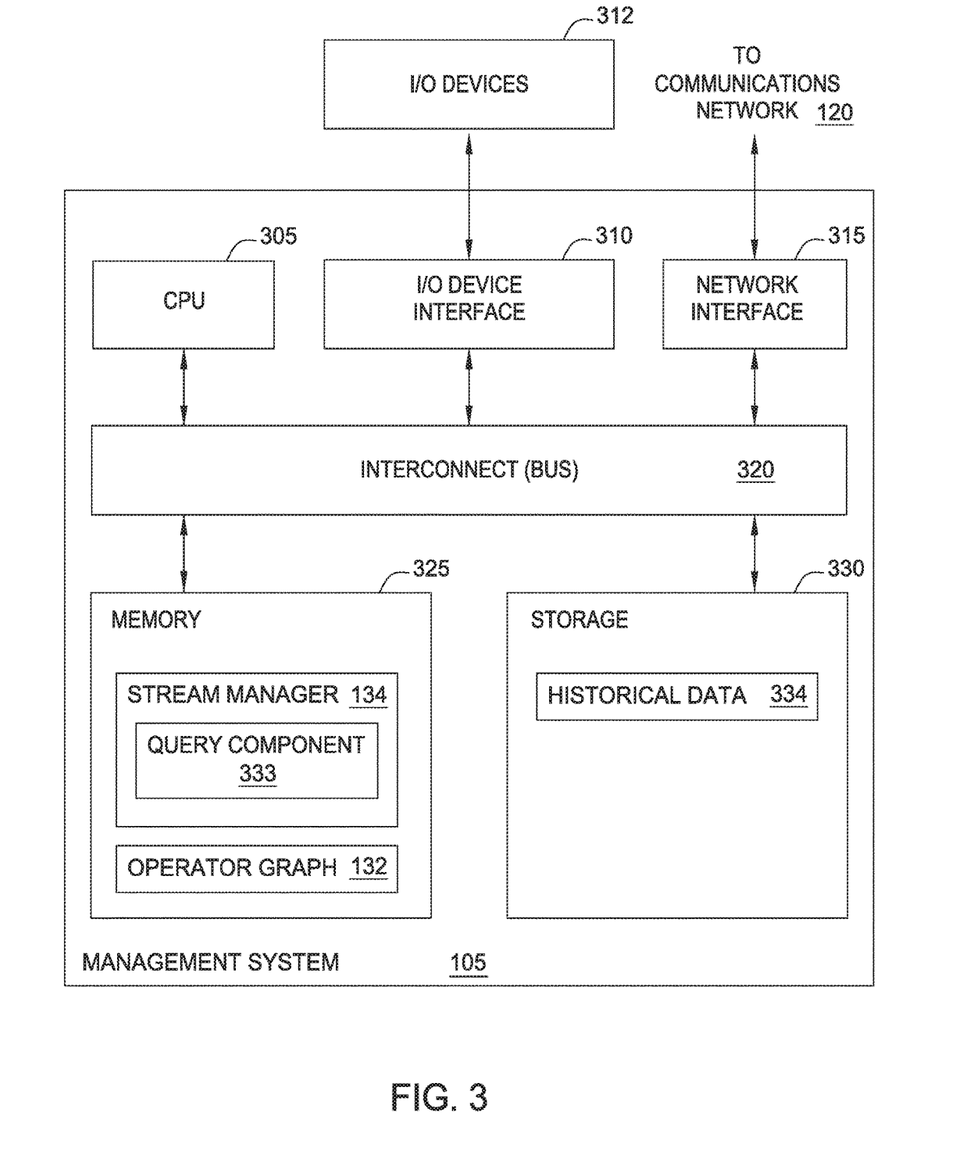
FIG. 3 is a more detailed view of the server management system of the streams computing application of FIGS. 1A-1B, according to one embodiment.

FIG. 3 is a more detailed view of the server management system 105 of the streams computing application of FIGS. 1A-1B, according to one embodiment. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 includes the stream manager 134 and the operator graph 132. The stream manager 134 may use the operator graph 132 to route tuples to PEs 235 for processing. The stream manager 134 also includes a query component 333, which is configured to communicate with the DBMS 110 to return data from the operator graph 132 of the streams computing application. For example, the DBMS 110 may receive a query specifying to return all employee identifiers (IDs) from an employee table of a database. The DBMS 110 may reference the corresponding employee IDs from the employee table of the database stored in the DBMS 110. However, the DBMS 110 may transmit an indication of the received query (and/or the received query itself) to the query component 333, which would then determine whether any data tuples in the streams computing application include an employee ID value. The query component 333 may then execute the query (or a portion of the query) against the data tuples in the streams computing application, and return any employee IDs discovered in the streams computing application. As previously indicated, the employee ID values may be discovered in one or more data tuples in the storage 230, PEs 235, operators 240, and the buffers 270, as well as data tuples that are in transit in the operator graph 132. Therefore, the query component 333 is configured to execute the query received by the DBMS 110 against the data of the streams computing application.

As shown, the storage 330 includes the historical data 334, which includes metadata describing the amount of time and/or resources used to process a query (and/or a portion of the query) received from the DBMS 110 against the data tuples of the streams computing application. Continuing with the previous example, the query manager 333 may determine that processing the employee ID query (or a portion of the employee ID query) required 300 milliseconds (ms), 1,000,000 CPU cycles, and 250 megabytes (MB) of RAM. As such, the query manager 333 may store an indication of the time and resources used to process the query in a record associated with the query in the historical data 334. The query manager 333 may also store an indication of how many records (e.g., data tuples) were returned by processing the query in the historical data 334. Doing so allows the query component 333 to return, to the DBMS 110, an indication of the amount of time and/or computing resources used in executing a given query against the data tuples of the streams computing application, and how many data tuples were returned by executing the query. The DBMS 110 may store the received historical data, which may then be used by the query governor 112 to compute estimated amounts of time and/or resources needed to process subsequent queries against the data tuples of the streams computing application. Furthermore, the DBMS 110 and/or query governor 112 may use the number of records returned when executing a given query when comparing queries to estimate the amount of time and/or resources used in executing a subsequent query. For example, the historical data 334 may indicate that 1,000 data tuples from the streams application were returned as responsive to a first query. If the query governor 112 receives a second query which targets the same data as the first query, the query governor 112 may determine that the second query is likely to return 1,000 data tuples, and may compute estimated amounts of resources and/or time for the second query based on the amounts of resources and/or time used to execute the first query (or other queries which returned approximately 1,000 data tuples from the streams computing application).

Figure 4:
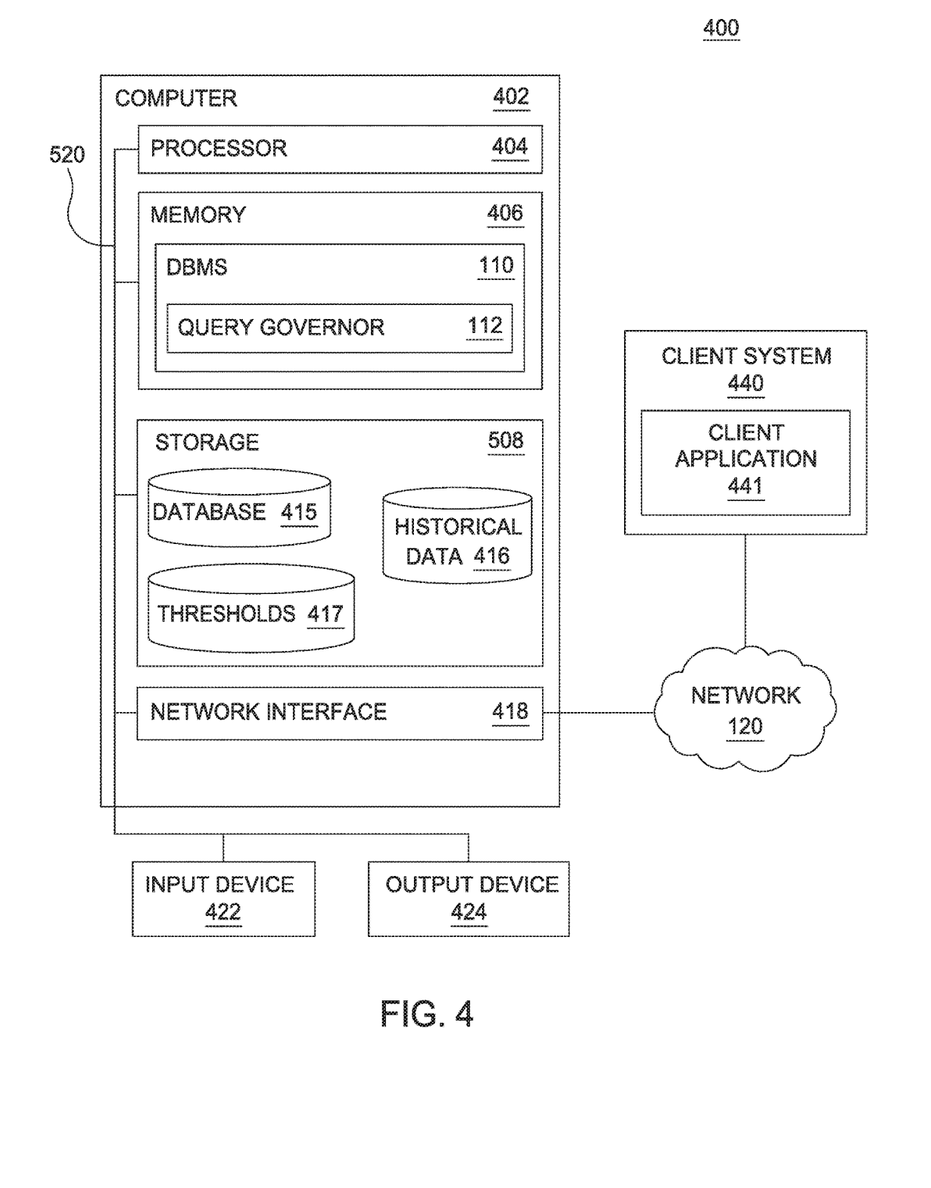
FIG. 4 depicts a computing system including the database management system of FIG. 1A, according to one embodiment.

FIG. 4 depicts a computing system 400 including the database management system of FIG. 1A, according to one embodiment. The networked system 400 includes a computer 402. The computer 402 may also be connected to other computers (e.g., the client system 440) via the network 120.

The computer 402 generally includes a processor 404 which obtains instructions and data via a bus 420 from a memory 406 and/or a storage 408. The computer 402 may also include one or more network interface devices 418, input devices 422, and output devices 424 connected to the bus 420. The computer 402 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 404 is a programmable logic device that performs instruction, logic, and mathematical processing, and may be representative of one or more CPUs. The network interface device 418 may be any type of network communications device allowing the computer 402 to communicate with other computers via the network 430.

The storage 408 is representative of hard-disk drives, solid state drives, flash memory devices, optical media and the like. Generally, the storage 408 stores application programs and data for use by the computer 402. In addition, the memory 406 and the storage 408 may be considered to include memory physically located elsewhere; for example, on another computer coupled to the computer 402 via the bus 420.

The input device 422 may be any device for providing input to the computer 402. For example, a keyboard and/or a mouse may be used. The input device 422 represents a wide variety of input devices, including keyboards, mice, controllers, and so on. Furthermore, the input device 422 may include a set of buttons, switches or other physical device mechanisms for controlling the computer 402. The output device 424 may include output devices such as monitors, touch screen displays, and so on.

As shown, the memory 406 contains the DBMS 110, which further includes the query governor 112, and the storage 408 contains a database 415, a historical data 416, and a data store of thresholds 417. In at least one embodiment, the database 415 is a relational database, however, the disclosure is applicable to other types of databases. The historical data 416 generally includes data and metadata on previously executed queries received by the DBMS. For example, the historical data 416 may include, for each previously executed query, an indication of the query (e.g., the text of the query, the type of statements in the query, the targeted data, etc.), and an indication of the time and/or resources (e.g., CPU, RAM, etc.) used in executing the query. As previously indicated, the historical data 416 may include data received from the historical data 334 of the management system 105. In this way, the query component 112 can consider the amount of resources used in executing the query against the data tuples of the streams computing application in addition to other factors which may affect the total execution time of the query (e.g., varying network latency to transmit the query to the query component 333, receive the results from the query component 333, merging the results from the query component 333 with results from the database 415, and the like).

The thresholds 417 are a plurality of time and/or resource thresholds for executing queries (or portions of queries). The thresholds 417 may include default thresholds and/or user-defined thresholds. Each threshold may be associated with one or more of a type of query (e.g., select, delete, update, etc.), a user and/or application submitting the query, a data type targeted by the query, and the like. Furthermore, each threshold may be associated with the amount of time and/or resources used in analyzing the data tuples of the streams computing application. In such embodiments, each threshold may apply to one or more of the streams computing application as a whole, one or more of the compute nodes 130, one or more operators 240 in the streams computing application, one or more processing elements 235 in the streams computing application, and/or one or more portions of a query.

In one embodiment, the DBMS 110 receives a query from the client application 441 of the client system 440. However, the DBMS 110 may receive a query from any entity. In response, the DBMS 110 may invoke the query governor 112 to determine whether to reject or accept the query for processing. According to embodiments disclosed herein, the query governor 112 may compute estimated time and/or resource consumption values for processing the query (and/or a portion of the query) against the data tuples of the streams computing application. The computed time and/or resource values may be based on values in the received query. For example, the query governor 112 may determine that a SELECT statement in the query which targets a certain data type in the streams computing application will require 30 milliseconds, 1,000,000 CPU cycles, and 4 GB of RAM to execute. Additionally and/or alternatively, the computations may be based on the historical data 416. Thus, for example, the historical data 416 may contain data indicating that the DBMS 110 previously processed a similar (or identical) query to the received query. In such a case, the query governor 112 may compute the estimated values for the received query based on corresponding recorded values for the previously processed query stored in the historical data 416. The DBMS 110 may determine whether a query is similar (or identical) to previously received queries based on any number of factors. For example, the DBMS 110 may compare the terms of queries to determine whether the terms match (or a predefined number of terms between two or more queries match). As another example, the DBMS 110 may compare the operations specified in two or more queries (e.g. select, insert, or update statements) to determine whether the operations match (or are similar). Furthermore, the DBMS 110 may compare the data targeted by each query (e.g., which database, table, column, etc., is targeted by the query). Further still, the DBMS 110 may estimate how many values will be returned as responsive to the query, and compare the estimated values to values returned by other queries in the historical data 416.

Once the query governor 112 computes the estimated values, the query governor 112 compares the computed estimated values to the applicable thresholds 417. Continuing with the previous example, the thresholds 417 may specify a time threshold of 10 milliseconds, 2,000,000 CPU cycles, and 3 GB of RAM to execute a SELECT statement of a query (which may be one of multiple statements of the query) against the data tuples of the streams computing application. In one embodiment, because the computed estimated time and RAM values for the SELECT statement exceed the respective thresholds, the query governor 112 would reject the query. In another embodiment, the query governor 112 may reject the portion of the query that targets the streams computing application, and permit execution of the query (and/or a portion thereof) against the database 415. However, if the computed values do not exceed the respective thresholds, the query governor 112 permits processing of the query against the database 415 and the streams computing application.

During processing of the query, the query governor 112 may monitor execution of the query, and compute updated values for the time and computing resources needed to complete execution of the query. If the updated values exceed the corresponding thresholds in the thresholds 417, the query governor 112 may halt execution of the query. In at least one embodiment, the updated values are compared against values in the thresholds 417 that are applicable to queries for which processing has begun.

Furthermore, more than one threshold in the thresholds 417 may apply to a query. For example, a time threshold, a RAM threshold, and a CPU cycle threshold may apply to a query. Further still, the thresholds 417 may apply to executing the query (and/or a portion of the query) against the streams computing application and/or executing the query against the database 415. For example, the time threshold may be a composite time threshold (e.g., 100 ms) that applies to executing the query against the streams computing application and the database 415. In such an example, the query governor 112 may compute an estimated time value which considers the amount of time required for executing the query against the database 415 and the streams computing application. If the estimated time value exceeds the threshold (e.g., 150 ms), the query governor 112 may reject the query. As another example, two different time thresholds may apply to a query, a first time threshold (e.g., 75 ms) that applies to processing the query against the data tuples of the streams computing application, and a second time threshold (e.g., 25 ms) that applies to processing the query against the database 415. The query governor 112 may then compute an estimated amount of time to process the query against the streams computing application, and compute an estimated amount of time to process the query against the database 415. If either computed time exceeds the corresponding threshold (e.g. 50 ms to process the query against the database 415), the query governor 112 may reject the query.

Figure 5:
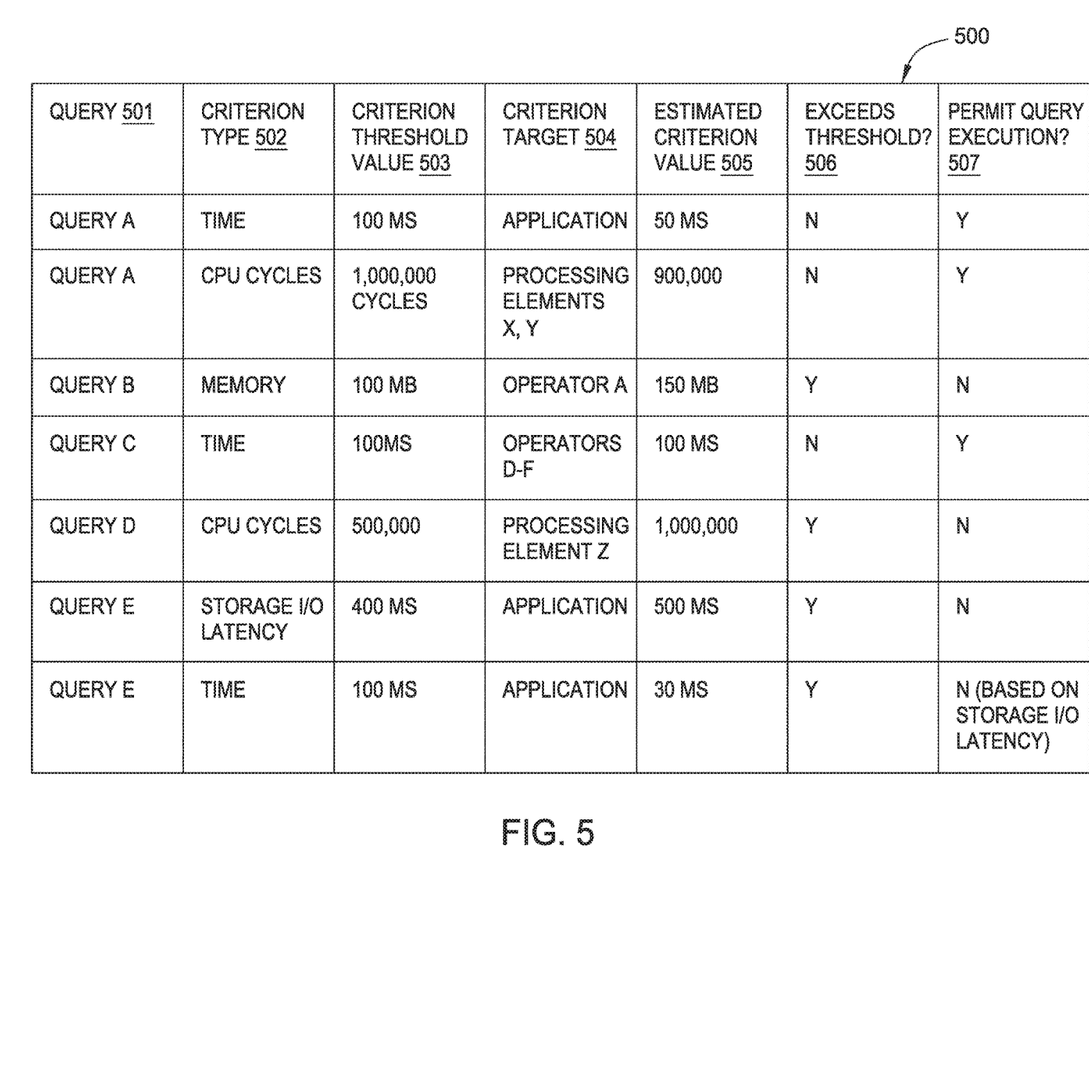
FIG. 5 depicts a table including an exemplary set of data values used by an enhanced query governor to manage query execution for databases that are integrated with streams computing applications, according to one embodiment.

FIG. 5 depicts a table 500 including an exemplary set of data values used by an enhanced query governor to manage query execution for databases that are integrated with streams computing applications, according to one embodiment. As shown, the table 500 includes columns 501-507, where column 501 identifies a query, column 502 corresponds to a criterion type (e.g., time, CPU cycles, etc.), column 503 corresponds to a threshold value for the criterion, column 504 corresponds to a criterion target (e.g., an operator, a group of processing elements, etc.), column 505 corresponds to an estimated criterion value computed by the query governor 112, column 506 indicates whether the computed estimated criterion value 505 exceeds the criterion threshold 503, and column 507 indicates whether the query governor 112 will permit execution of the corresponding query 501.

For example, as shown, example query B is associated with a memory threshold of 100 MB. The 100 MB may correspond to the maximum amount of RAM that may be used by example operator A to analyze the data tuples stored therein (and/or in buffers associated with operator A) against the parameters of query B. As shown, the query governor 112 has computed an estimated value of 150 MB of RAM for operator A to analyze the corresponding data tuples against query B. Because the query governor 112 has determined that the estimated amount of RAM exceeds the RAM threshold, the query governor 112 has determined to not permit execution of query B.

As previously indicated, more than one criterion may apply to a given query. For example, as shown, query E is associated with a time criterion as well as a storage I/O latency criterion. Specifically, query E is associated with a threshold time value of 100 ms and a value of 400 ms for storage I/O latency, each of which are associated with the entire streams computing application. Because the estimated value of 500 ms I/O latency exceeds the corresponding threshold, the query governor 112 rejects query A, even though the estimated value time value of 30 ms does not exceed the time threshold of 100 ms.

Figure 6:
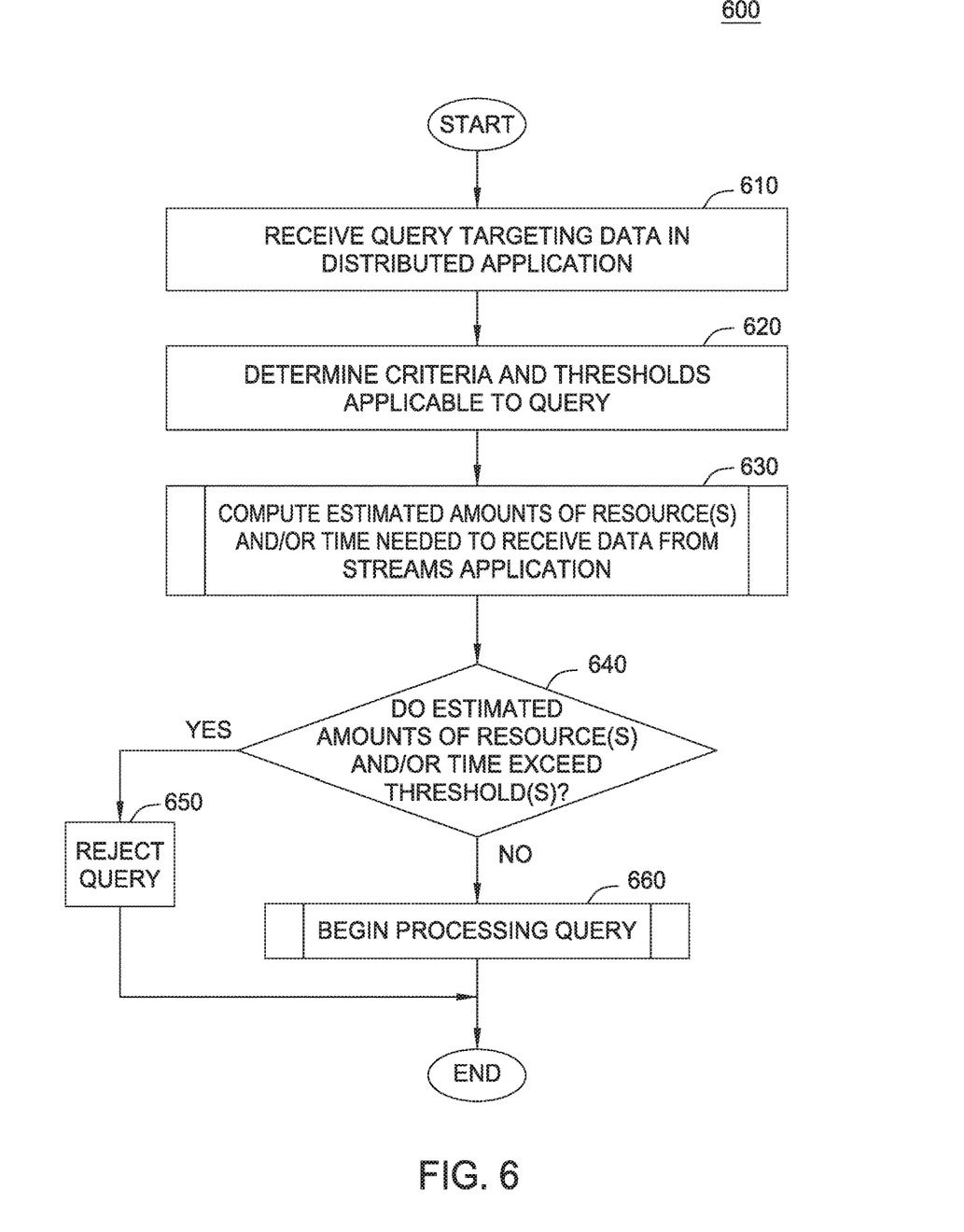
FIG. 6 is a flow chart illustrating an example method to provide an enhanced query governor which manages query execution for databases that are integrated with streams computing applications, according to one embodiment.

FIG. 6 is a flow chart illustrating an example method 600 to provide an enhanced query governor 112 which manages query execution for databases that are integrated with streams computing applications, according to one embodiment. As shown, the method 600 begins at block 610, where the query governor 112 receives a query for processing, where the query (or portions thereof) at least in part targets data in the distributed application. The query may also target data in the database 415. In at least one embodiment, the query may include an indication to target data tuples in the distributed application. However, in some embodiments, whether or not the query includes an indication to target data tuples in the distributed application, the query governor 112 and/or DBMS 110 are configured to automatically process queries against the data tuples of the distributed application (e.g., based on user-specified parameters, parameters specific to client applications 441, and the like).

At block 620, the query governor 112 determines the criteria and thresholds applicable to the received query based on data stored in the thresholds 417. The query governor 112 may determine the criteria based on attributes of the query, such as the type of statements included in the query, the data targeted by the query, and the like. For example, if the query includes a delete statement, a time criterion may apply to the query. As another example, if the query includes a select statement, a time criterion and a CPU cycles criterion may apply to the query. The criteria may also be based on user-specified parameters and/or parameters specific to the client application 441 issuing the query. The applicable time and/or resource thresholds may be defined in the threshold data 417 and/or specified as metadata attributes in the query. As previously indicated, the applicable thresholds may be based on the type of query received. For example, a time and/or computing resource threshold value for a select statement portion of a query may differ from the time and/or computing resource threshold value for an insert statement portion of a query. In yet another embodiment, the threshold is based on a priority value assigned to the query. For example, the priority value may be assigned based on the origin of the query. Thus, for example, a query statement received from a customer-facing production-stage application 441 may receive a larger threshold amount of time and/or computing resources than a query received from an internal application 441 that is still under development.

Additionally, the threshold amount of time and/or computing resources may be derived from which user submitted the query, or a group the user submitting the query belongs to.

At block 630, described in greater detail with reference to FIG. 7, the query governor 112 computes estimated amounts of time and/or computing resources needed to receive data from the streams computing application. Generally, the query governor 112 computes the estimated amounts of time and/or computing resources based on one or more of the historical data 416, attributes of the query (e.g., the types of statements in the query), and metadata describing the query. At block 640, the query governor 112 determines whether the estimated amounts of time and/or computing resources computed at block 630 exceed the corresponding thresholds. If at least one of the estimated amounts of time and/or computing resources computed at block 630 exceed the corresponding threshold, the method proceeds to block 650, where the query governor 112 rejects the query, and the query is not processed. However, in at least one embodiment, the query governor 112 rejects execution of the query against the streams computing application, and permits execution of the query against the database 415. In at least one embodiment, the query governor 112 notifies the client application 441 that the query has been rejected because at least one threshold value was exceeded. If the estimated amounts of time and/or computing resources computed at block 630 do not exceed the corresponding thresholds, the method proceeds to block 660, described in greater detail with reference to FIG. 8, where the query governor 112 submits the query for processing, and execution of the query begins.

Figure 7:
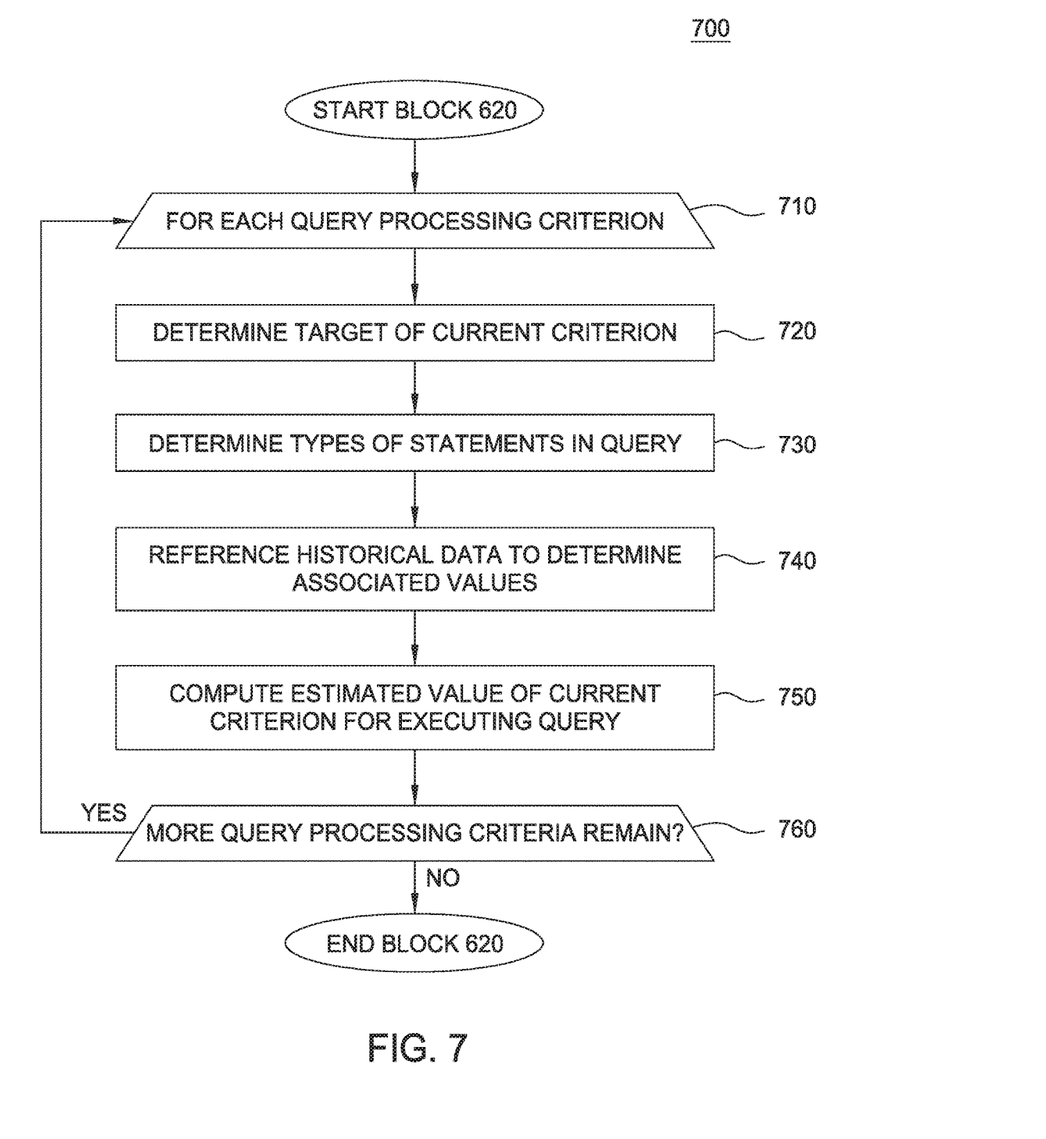
FIG. 7 is a flow chart illustrating an example method to compute estimated amounts of resources and/or time needed to receive data from a streams application, according to one embodiment.

FIG. 7 is a flow chart illustrating an example method 700 corresponding to block 630 to compute estimated amounts of resources and/or time needed to receive data from a streams application, according to one embodiment. As shown, the method 700 begins at block 710, where the query governor 112 executes a loop for each query processing criterion determined at block 620. For example, the query received at block 610 may be associated with a time threshold, a CPU cycle threshold, and a RAM threshold. At block 720, the query governor 112 determines the target of the current criterion, such as the corresponding streams computing application, an operator 240 or group of operators 240 in the streams computing application, a processing element 235 or group of processing elements in the streams computing application, and/or a compute node 130 or group of compute nodes 130 on which the streams computing application executes.

At block 730, the query governor 112 optionally determines the types of statements in the query. For example, the query may include a select statement, insert statement, delete statement, and the like. Each statement may be associated with a different value for the current criterion in the historical data 416. At block 740, the query governor 112 references the historical data 416 to determine any associated time and/or computing resource values associated with the received query. For example, the query governor 112 may reference the historical data 416 to determine whether the query exists in the historical data 416. As another example, the query governor 112 may reference the historical data 416 to determine whether a substantially similar query exists in the historical data 416. Doing so allows the query governor 112 to use the associated time and/or resource consumption values experienced when previously executing the query (or similar query) one or more times. The query governor 112 may also reference the historical data 416 based on the types of statements in the query to determine the amounts of time and/or resources used when these types of statements were previously executed one or more times.

At block 750, the query governor 112 computes an estimated value for the current criterion, where the estimated value reflects an estimated amount of time and/or computing resources used to execute the query (or a portion thereof). Generally, the query governor 112 computes the estimated value for the current criterion based on one or more of the determinations made at blocks 720-740. At block 760, the query governor 112 determines whether more query processing criteria remain. If more query processing criteria remain, the method returns to block 710. If no more query processing criteria remain the method 700 ends.

Figure 8:
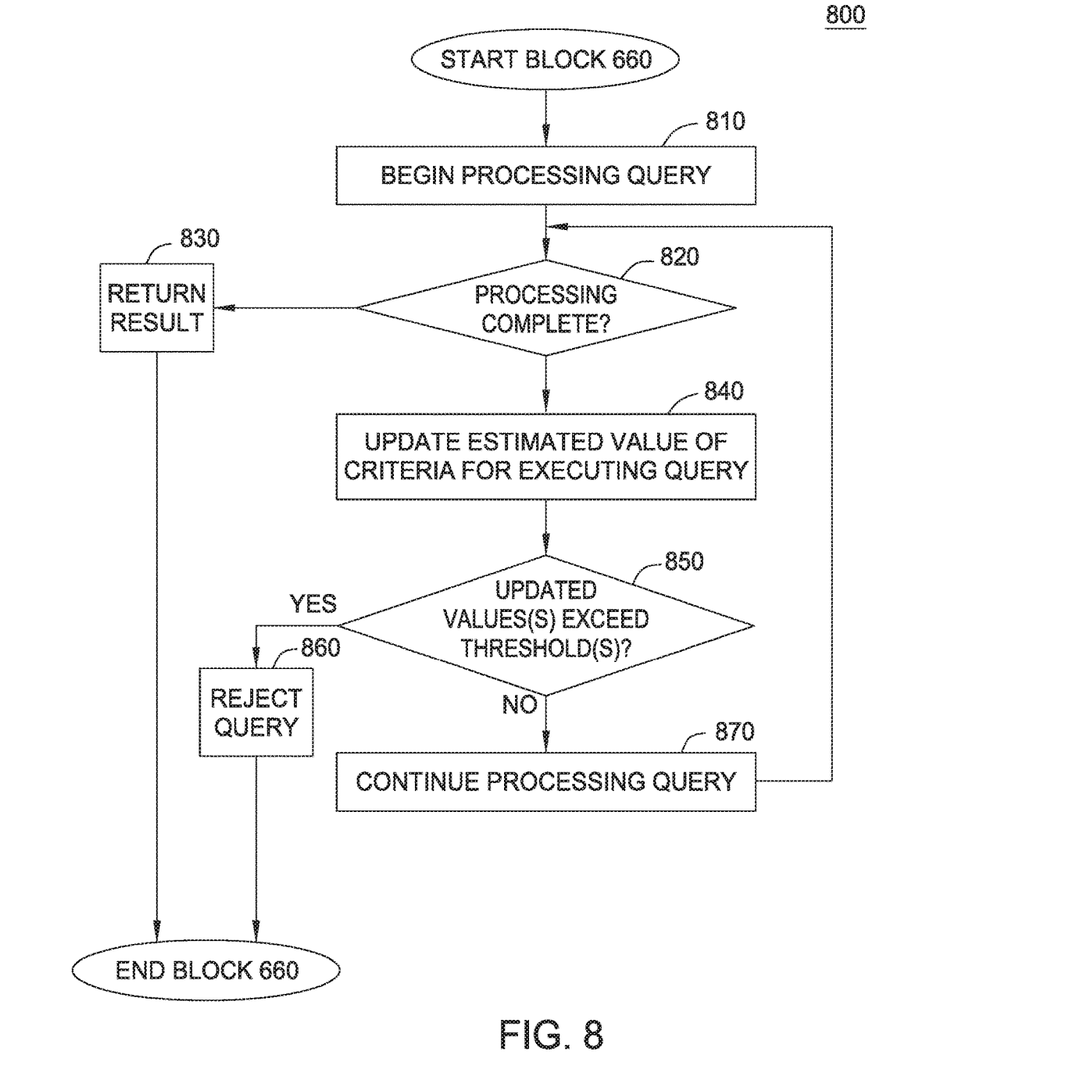
FIG. 8 is a flow chart illustrating an example method to manage query execution, according to one embodiment.

FIG. 8 is a flow chart illustrating an example method 800 corresponding to block 660 to manage query execution, according to one embodiment. As shown, the method 800 begins at block 810, where the DBMS 110 begins processing the received query. In processing the query, the DBMS 110 also interfaces with the query component 333 of the streams manager 134. For example, the DBMS 110 may send the query to the query component 333 of the streams manager 134, which then applies one or more statements of the query to the data tuples of the streams computing application to determine whether any data tuples of the query satisfy the query statements. The query component 333 may then send results of applying the query to the data tuples of the streams computing application to the DBMS 110.

At block 820, the query governor 112 determines whether the query processing has completed. If the processing of the query has completed, the DBMS 110 returns the result of executing the query at block 830. Generally, the DBMS 110 will return the result produced from executing the query to whatever entity submitted the query (e.g., the client application 441). If the query processing has not completed, the method proceeds to block 840, where the query governor 112 computes updated estimated values for completing processing of the query for each relevant criteria (e.g., time and/or computing resources). In at least one embodiment, the query governor 112 computes the updated estimated values based on the steps of the method 700. At block 850, the query governor 112 determines whether at least one of the updated values computed at block 840 exceeds the corresponding threshold value in the thresholds 417. The corresponding values in the thresholds 417 may be the same or different than the threshold values applied when computing the initial estimated values at block 630.

If at least one of the updated values computed at block 840 exceed the corresponding threshold, the method proceeds to block 860, where the query governor 112 rejects the query, which halts processing of the query. In halting the processing of the query the query governor 112 may suspend execution of the query or terminate execution of the query. However, in at least one embodiment, the query governor 112 rejects execution of the query against the streams computing application, and permits execution of the query against the database 415. If each of the updated values computed at block 840 do not exceed the corresponding threshold, the method proceeds to block 870, where processing of the query continues. The method may then return to block 820, where the query governor 112 again determines whether the query has finished executing. Once the DBMS 110 returns the result of the query, or once the query governor 112 halts the execution of the query and rejects the query for execution, the method 800 ends.

Advantageously, embodiments disclosed herein provide an enhanced query governor which rejects queries that may exceed time and/or computing resource consumption applicable to executing the query at least in part against the data tuples of a streams computing application. Doing so prevents wasting system resources on queries that will require too much time and/or computing resources to complete, improving the performance of the DBMS 110 and the streams computing application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    receiving, by a database management system (DBMS), a query for execution;
    computing, by a query governor, a first resource consumption value for executing a first portion of the received query against a plurality of data tuples in an operator graph of a distributed application; and
    upon determining that the first resource consumption value does not exceed a first threshold value, executing the query by operation of one or more computer processors.

2. The method of claim 1, wherein the first resource consumption value is associated with one of: (i) an amount of time required to execute the first portion of the received query against the plurality of data tuples of the distributed application, and (ii) an amount of a computing resource used in executing the first portion of the received query against the plurality of data tuples in the operator graph of the distributed application, wherein the computing resource comprises at least one of: (i) a processor, (ii) a memory, (iii) a storage, (iv) a storage input/output (I/O), and (v) a network bandwidth.

3. The method of claim 1, further comprising while executing the query:

computing, by the query governor, a second resource consumption value for executing the first portion of the received query against the plurality of data tuples in the operator graph of the distributed application; and halting, by the query governor, the execution of the first portion of the query upon determining that the second resource consumption value exceeds a second threshold value.

4. The method of claim 1, wherein the query governor computes the first resource consumption value based on one or more of: (i) historical data collected from queries previously executed by the DBMS against the plurality of data tuples in the operator graph of the distributed application, (ii) a value in the received query, and (iii) collected metadata describing the received query.

5. The method of claim 1, wherein the distributed application comprises:
a plurality of processing elements comprising one or more operators, the operators configured to process data tuples, wherein the plurality of processing elements execute on at least one compute node of a plurality of compute nodes; and
the operator graph of a plurality of operators, the operator graph defining at least one execution path in which a first operator of the plurality of operators is configured to: (i) receive data tuples from at least one upstream operator and (ii) transmit data tuples to at least one downstream operator.

6. The method of claim 5, wherein the first threshold value is specific to one or more of:
(i) the distributed application, (ii) one or more of the plurality of processing elements, (iii) one or more of the plurality of operators, and (iv) one or more of the plurality of compute nodes.

7. The method of claim 1, further comprising:
computing, by the query governor, a second resource consumption value for executing the first portion of the received query against the plurality of data tuples in the operator graph of the distributed application; and
upon determining that the second resource consumption value exceeds a second threshold value, rejecting execution of the first portion of the query by the query governor,
wherein the first resource consumption value and the first threshold value correspond to a first resource, wherein the second resource consumption value and the second threshold value correspond to a second resource, different than the first resource.

8. A computer program product, comprising:
a computer-readable storage medium having computer readable program code embodied therewith, the computer readable program code executable by a processor to perform an operation comprising:
receiving, by a database management system (DBMS), a query for execution;
computing, by a query governor, a first resource consumption value for executing a first portion of the received query against a plurality of data tuples in an operator graph of a distributed application; and
upon determining that the first resource consumption value does not exceed a first threshold value, executing the query by operation of one or more computer processors.

9. The computer program product of claim 8, wherein the first resource consumption value is associated with one of: (i) an amount of time required to execute the received query against the plurality of data tuples of the distributed application, and (ii) an amount of a computing resource used in executing the received query against the plurality of data tuples in the operator graph of the distributed application, wherein the computing resource comprises at least one of: (i) a processor, (ii) a memory, (iii) a storage, (iv) a storage input/output (I/O), and (v) a network bandwidth.

10. The computer program product of claim 8, the operation further comprising while executing the query:
computing, by the query governor, a second resource consumption value for executing the received query against the plurality of data tuples in the operator graph of the distributed application; and
halting, by the query governor, the execution of the query upon determining that the second resource consumption value exceeds a second threshold value.

11. The computer program product of claim 8, wherein the query governor computes the first resource consumption value based on one or more of: (i) historical data collected from queries previously executed by the DBMS against the plurality of data tuples in the operator graph of the distributed application, (ii) a value in the received query, and (iii) collected metadata describing the received query.

12. The computer program product of claim 8, wherein the distributed application comprises:
a plurality of processing elements comprising one or more operators, the operators configured to process data tuples, wherein the plurality of processing elements execute on at least one compute node of a plurality of compute nodes; and
the operator graph of a plurality of operators, the operator graph defining at least one execution path in which a first operator of the plurality of operators is configured to: (i) receive data tuples from at least one upstream operator and (ii) transmit data tuples to at least one downstream operator.

13. The computer program product of claim 12, wherein the first threshold value is specific to one or more of: (i) the distributed application, (ii) one or more of the plurality of processing elements, (iii) one or more of the plurality of operators, and (iv) one or more of the plurality of compute nodes.

14. The computer program product of claim 8, the operation further comprising:
computing, by the query governor, a second resource consumption value for executing the received query against the plurality of data tuples in the operator graph of the distributed application; and
upon determining that the second resource consumption value exceeds a second threshold value, rejecting execution of the query by the query governor,
wherein the first resource consumption value and the first threshold value correspond to a first resource, wherein the second resource consumption value and the second threshold value correspond to a second resource, different than the first resource.

15. A system, comprising:
a processor; and
a memory storing one or more instructions which, when executed by the processor, performs an operation comprising:
receiving, by a database management system (DBMS), a query for execution;
computing, by a query governor, a first resource consumption value for executing a first portion of the received query against a plurality of data tuples in an operator graph of a distributed application; and upon determining that the first resource consumption value does not exceed a first threshold value, executing the query by operation of one or more computer processors.

16. The system of claim 15, wherein the first resource consumption value is associated with one of: (i) an amount of time required to execute the received query against the plurality of data tuples of the distributed application, and (ii) an amount of a computing resource used in executing the received query against the plurality of data tuples in the operator graph of the distributed application, wherein the computing resource comprises at least one of: (i) a processor, (ii) a memory, (iii) a storage, (iv) a storage input/output (I/O), and (v) a network bandwidth.

17. The system of claim 15, the operation further comprising while executing the query:
computing, by the query governor, a second resource consumption value for executing the received query against the plurality of data tuples in the operator graph of the distributed application; and
halting, by the query governor, the execution of the query upon determining that the second resource consumption value exceeds a second threshold value.

18. The system of claim 15, wherein the query governor computes the first resource consumption value based on one or more of: (i) historical data collected from queries previously executed by the DBMS against the plurality of data tuples in the operator graph of the distributed application, (ii) a value in the received query, and (iii) collected metadata describing the received query.

19. The system of claim 15, wherein the distributed application comprises:
a plurality of processing elements comprising one or more operators, the operators configured to process data tuples, wherein the plurality of processing elements execute on at least one compute node of a plurality of compute nodes; and
the operator graph of a plurality of operators, the operator graph defining at least one execution path in which a first operator of the plurality of operators is configured to: (i) receive data tuples from at least one upstream operator and (ii) transmit data tuples to at least one downstream operator.

20. The system of claim 19, wherein the first threshold value is specific to one or more of:
(i) the distributed application, (ii) one or more of the plurality of processing elements, (iii) one or more of the plurality of operators, and (iv) one or more of the plurality of compute nodes.

* * * * *